(12) United States Patent
Ross et al.

(10) Patent No.: US 10,730,510 B2
(45) Date of Patent: Aug. 4, 2020

(54) APPARATUS AND METHOD FOR SENSING TILT OF AN OBJECT

(71) Applicant: RTMS PTY LIMITED, Hawthorn, Victoria (AU)

(72) Inventors: Simon James Ross, Burleigh (AU); Daniel Condran, Burleigh (AU); Darren Irving, Burleigh (AU)

(73) Assignee: RTMS Pty Limited, Hawthorn, Victoria (AU)

( * ) Notice: Subject to any disclaimer, the term of this patent is extended or adjusted under 35 U.S.C. 154(b) by 14 days.

(21) Appl. No.: 16/082,251

(22) PCT Filed: Mar. 3, 2017

(86) PCT No.: PCT/AU2017/050189
§ 371 (c)(1),
(2) Date: Sep. 4, 2018

(87) PCT Pub. No.: WO2017/147660
PCT Pub. Date: Sep. 8, 2017

(65) Prior Publication Data
US 2019/0077395 A1 Mar. 14, 2019

Related U.S. Application Data
(60) Provisional application No. 62/304,047, filed on Mar. 4, 2016.

(51) Int. Cl.
*B60W 30/04* (2006.01)
*B60W 40/112* (2012.01)
(Continued)

(52) U.S. Cl.
CPC .............. *B60W 30/04* (2013.01); *A01D 75/20* (2013.01); *A01D 75/28* (2013.01); *B60K 28/14* (2013.01);
(Continued)

(58) Field of Classification Search
None
See application file for complete search history.

(56) References Cited

U.S. PATENT DOCUMENTS

2004/0010359 A1   1/2004  Koch
2008/0319589 A1  12/2008  Lee et al.
(Continued)

FOREIGN PATENT DOCUMENTS

DE  10 2008 027 087 A1  12/2008
EP      2 045 575 A2      4/2009
EP      2 492 164 A2      8/2012

OTHER PUBLICATIONS

International Search Report dated Apr. 13, 2017 for International Application No. PCT/AU2017/050189 filed on Mar. 3, 2017.
(Continued)

*Primary Examiner* — Abdhesh K Jha
(74) *Attorney, Agent, or Firm* — Knobbe Martens Olson & Bear, LLP (57) ABSTRACT

A tilt-sensing apparatus for a vehicle, comprising: a controller; and a motion tracker, wherein the controller is configured for communication with the motion tracker and a display, wherein the motion tracker is configured for attachment to a vehicle at a position remote to the display and comprises a first tilt sensor configured to measure a first tilt angle with respect to a first axis and a second tilt sensor configured to measure a second tilt angle with respect to a second axis, wherein the controller is configured to receive data via an output of the motion tracker, said data comprising the first tilt angle and the second tilt angle, and communicate an instruction to the display to display a graphical representation indicative of the first tilt angle and the second tilt angle, and associated method.

16 Claims, 9 Drawing Sheets

(51) Int. Cl.
  *B60W 50/14* (2020.01)
  *B60W 40/11* (2012.01)
  *B60W 30/02* (2012.01)
  *A01D 75/28* (2006.01)
  *B60K 28/14* (2006.01)
  *A01D 75/20* (2006.01)

(52) U.S. Cl.
  CPC ............ *B60W 30/02* (2013.01); *B60W 40/11* (2013.01); *B60W 40/112* (2013.01); *B60W 50/14* (2013.01); *B60W 2030/041* (2013.01); *B60W 2050/146* (2013.01); *B60W 2520/16* (2013.01)

(56) References Cited

U.S. PATENT DOCUMENTS

2009/0089703 A1  4/2009  Kim et al.
2010/0191408 A1  7/2010  Boylston et al.

OTHER PUBLICATIONS

Extended European Search Report issued for application 17759015.5-1012/3422839 PCT/AU2017050189 dated Dec. 17, 2019.

APPARATUS AND METHOD FOR SENSING TILT OF AN OBJECT

FIELD OF THE INVENTION

The invention generally relates to tilt-sensing apparatuses for vehicles.

BACKGROUND TO THE INVENTION

Certain vehicles, such as mowers, are used on terrain with variations in slope. These vehicles typically are rated to operate on slopes up to, but not exceeding, a maximum slope. The maximum slope is typically specified in a manual for the vehicle. Some manuals also contain information as to how to manually measure a slope.

One example of a prior art device to assist a driver to assess whether the slope they are driving on is safe is a ball-based visual system mounted to the dashboard of the vehicle where the position of the ball along a path indicates the current angle of the slope across which the vehicle is driving. That is, the device indicates the angle of the slope perpendicular to the direction in which the vehicle is driving.

SUMMARY OF THE INVENTION

According to an aspect of the present invention, there is provided a tilt-sensing apparatus for a vehicle, comprising a controller and a motion tracker, wherein the controller configured for communication with the motion tracker and a display, wherein the motion tracker is configured for attachment to a vehicle in a position remote to the display and comprises a first tilt sensor configured to measure a first tilt angle with respect to a first axis and a second tilt sensor configured to measure a second tilt angle with respect to a second axis, wherein the controller is configured to: periodically or continuously receive data via an output of the motion tracker, said data comprising the first tilt angle and the second tilt angle; communicate an instruction to the display to display a graphical representation of the first tilt angle and a graphical representation of the second tilt angle.

According to another aspect of the present invention, there is provided a tilt-sensing apparatus for a vehicle, comprising a controller and a motion tracker, wherein the controller is configured for communication with the motion tracker and a display, wherein the motion tracker comprises a first tilt sensor configured to measure a first tilt angle with respect to a first axis and a second tilt sensor configured to measure a second tilt angle with respect to a second axis, wherein the controller is configured to: receive data via an output of the motion tracker, said data comprising the first tilt angle and the second tilt angle; communicate an instruction to the display to display a graphical representation indicative of the first tilt angle and the second tilt angle.

According to another aspect of the present invention, there is provided a tilt-sensing apparatus for a vehicle, comprising a controller and a motion tracker, wherein the controller is configured for communication with the motion tracker and a display, wherein the motion tracker is attached to a vehicle in a position on a fixed chassis of the vehicle remote to the display and comprises a first tilt sensor configured to measure a first tilt angle with respect to a first axis, wherein the controller is configured to: receive data via an output of the motion tracker, said data comprising the first tilt angle; communicate an instruction to the display to display a graphical representation indicative of the first tilt angle and the second tilt angle.

Preferably, the controller is locatable separately within the vehicle to the motion tracker, and the tilt-sensing apparatus further comprises a wired data connection between the controller and the motion tracker. Preferably, in addition or alternatively, the controller is locatable separately within the vehicle to the display, and the tilt-sensing apparatus further comprises a wired data connection between the controller and the display. Optionally, the motion tracker comprises one or more attachment features configured to assist with attachment of the motion tracker to the vehicle and/or alignment means. Typically, the first axis is orthogonal to the second axis. Preferably, the output of the motion tracker is calibrated. Calibration may be performed in order to calibrate the motion tracker in response to a user input.

In an embodiment, the graphical representation of the first tilt angle comprises a numerical representation of the first tilt angle and the graphical representation of the second tilt angle comprises a numerical representation of the second tilt angle. Optionally, the numerical indication of the first tilt angle comprises a first numeral value indicating a tilt angle with respect to a first direction and a second numeral value indicating the tilt angle with respect to a second direction, and wherein the numerical indication of the second tilt angle comprises a first numeral value indicating a tilt angle with respect to a first direction and a second numeral value indicating the tilt angle with respect to a second direction. In an embodiment, the graphical representation of the first tilt angle comprises a non-numerical representation of the first tilt angle and wherein the graphical representation of the second tilt angle comprises a non-numerical representation of the second tilt angle.

Preferably, the controller is configured to determine that the first tilt angle has exceeded a preconfigured first threshold parameter and/or the second tilt angle has exceeded a preconfigured second threshold parameter and, in response, to communicate an instruction to the display to present a graphical warning and, wherein, in response, the display is configured to present the graphical warning. The first threshold parameter may comprise one threshold tilt angle and the second threshold parameter comprises one threshold tilt angle. Alternatively, the first threshold parameter may comprise two or more threshold tilt angles, each uniquely associated with a direction of the first axis, and/or the second threshold parameter may comprise two or more threshold tilt angles, each uniquely associated with a direction of the second axis. Optionally, the display further comprises an audio output, and wherein the display is configured to activate the audio output in conjunction with presenting the graphical warning. An alternative option has the controller interfaced with an auxiliary speaker, the controller being configured to activate the auxiliary speaker in conjunction with communicating the instruction to the display to present a graphical warning. For this option, the apparatus may comprise the auxiliary speaker or, alternatively, the speaker may be provided with the vehicle. Optionally, the controller is selectively disabled and enabled, and further wherein the controller is configured to change from disabled to enabled in response to one or both of the first tilt angle and second tilt angle meeting a predefined trigger event.

Preferably, the controller comprises a controller housing, the motion tracker comprises a motion tracker housing, and/or the display comprises a display housing. Optionally, one or more of the housings comprise a resin, wherein components configured to implement aspects of the controller, motion tracker, and/or display are surrounded (at least substantially) by the resin.

The controller may be configured to record operating data derived from the output of the motion tracker within a memory of the controller.

In an embodiment, the controller further comprises: an interface port configured to enable instructions to be communicated from an external source to the controller and/or enable the controller to communicate information to an external source; and/or a wireless communication module.

The controller may further comprise an auxiliary output configured for interfacing with the vehicle. This auxiliary output may comprise a CAN bus.

According to an embodiment, the tilt-sensing apparatus comprises the display. According to another embodiment, the vehicle comprises the display, and the controller comprises a display interface for enabling the controller to communicate with the display. The controller may correspond to functionality provided by a vehicle computing unit.

The tilt-sensing apparatus may further comprise a limiter for reducing errors in measurement of acceleration and/or rate of rotation.

According to another aspect of the present invention, there is provided a vehicle comprising the tilt-sensing apparatus of the above aspect, wherein the display is located such as to be visible to a driver of the vehicle and wherein the motion tracker is securely affixed to the vehicle in a location on a fixed chassis portion of the vehicle, for example, at or near the base of the vehicle. The vehicle preferably includes a vehicle controller and the auxiliary output may then be interfaced with the vehicle controller.

According to another aspect of the present invention, there is provided a method of providing feedback of the orientation of a vehicle, the method comprising the steps of: receiving a first output from a first tilt sensor comprising data corresponding to a measured first tilt angle in respect of a first axis; receiving a second output from a second tilt sensor comprising data corresponding to a measured second tilt angle along a second axis; comparing the first output to a first threshold parameter and the second output to a second threshold parameter; in response, generating a display instruction; and communicating the display instruction to a display, wherein the first tilt sensor and second tilt sensor are located within a motion tracker, and wherein the display is located remotely to the motion tracker.

According to another aspect of the present invention, there is provided a method of providing feedback of the orientation of a vehicle, the method comprising the steps of: receiving a first output from a first tilt sensor comprising data corresponding to a measured first tilt angle in respect of a first axis; receiving a second output from a second tilt sensor comprising data corresponding to a measured second tilt angle along a second axis; comparing the first output to a first threshold parameter and the second output to a second threshold parameter; in response, generating a display instruction; and communicating the display instruction to a display, wherein the first tilt sensor and second tilt sensor are located within a motion tracker.

According to yet another aspect of the present invention, there is provided a method of providing feedback of the orientation of a vehicle, the method comprising the steps of: receiving a first output from a first tilt sensor comprising data corresponding to a measured first tilt angle in respect of a first axis; comparing the first output to a first threshold; in response, generating a display instruction; and communicating the display instruction to a display, wherein the first tilt sensor is located within a motion tracker, and wherein the display is located remotely to the motion tracker on a fixed chassis of the vehicle.

The first output and the second output may each be received at a controller, and the controller may generate and communicate the display instruction.

Optionally, the controller is located separately to the motion tracker and the first output and second output are received via a wired data connection between the controller and the motion tracker. Also optionally, (in addition or alternatively) the controller is located separately to the display and the display instruction is communicated via a wired data connection between the controller and the display. The controller may compare the first output to the first threshold parameter and the second output to the second threshold parameter. The controller may be selectively enabled and disabled, and the method may further comprise the step of the controller changing from disabled to enabled in response to one or both of the first tilt angle and second tilt angle meeting a predefined trigger event.

Preferably, the first output is compared to a first threshold tilt angle in a first direction along the first axis and a second threshold tilt angle in a second direction along the first axis and wherein the second output is compared to a threshold tilt angle in a first direction along the second axis and a threshold tilt angle in a second direction along the second axis.

In an embodiment, the method further comprises the step of identifying that the first output exceeds the first threshold parameter and/or the second output exceeds the second threshold parameter, wherein the display instruction comprises an instruction to display a warning indicating the said first and/or second threshold parameters has been exceeded.

In an embodiment, the method further comprises displaying, on the display: a first numerical indication of the first tilt angle comprising a first numeral value indicating the tilt angle in a first direction of the first tilt angle and a second numeral value indicating the tilt angle in a second direction of the first tilt angle, and wherein the second numerical indication of the second tilt angle comprises a first numeral value indicating the tilt angle in a first direction of the second tilt angle and a second numeral value indicating the tilt angle in a second direction of the second tilt angle, and/or a first non-numerical graphical representation of the first tilt angle and a second non-numerical graphical representation of the second tilt angle.

Optionally, the method further comprises the step of: recording instances where one or more threshold tilt angles have been exceeded. Also optionally, the method further comprising the step of: wirelessly communicating instances where one or more threshold tilt angles have been exceeded to an external device.

The display instruction may be generated in dependence on which of a plurality of threshold levels has been exceeded.

Preferably, the method further comprises the step of: communicating an auxiliary message to the vehicle when one or more threshold tilt angles have been exceeded to an external device.

Preferably, the first output and second output are calibrated.

The method may further comprise the step of adjusting a parameter of an accelerometer and/or a gyroscope provided for determining the first output and second output in response to a limiter determining that a threshold acceleration and/or threshold rate of rotation is exceeded.

According to yet another aspect of the present invention, there is provided a tilt-sensing apparatus for a vehicle, comprising a controller in communication with a motion tracker and a display, wherein the motion tracker is configured for attachment to a vehicle in a position remote to the display and comprises a first tilt sensor configured to measure a first tilt angle with respect to a first axis and a second tilt sensor configured to measure a second tilt angle with respect to a second axis, wherein the controller is configured to: receive data via an output of the motion tracker, said data comprising the first tilt angle and the second tilt angle; communicate information derived from the data to a remote computing device.

The information may be communicated in response to a threshold exceeded event is determined by the controller to be associated with the data. Optionally, the information is stored within a memory of the controller, and the controller is configured to communicate the information to the remote computing device after receiving an instruction to do so. The information may be communicated wirelessly to the remote computing device. Alternatively, the information may be communicated via a removable physical memory.

According to still yet another aspect of the present invention, there is provided a method of providing feedback of the orientation of a vehicle, the method comprising the steps of: receiving a first output from a first tilt sensor comprising data corresponding to a measured first tilt angle in respect of a first axis; receiving a second output from a second tilt sensor comprising data corresponding to a measured second tilt angle along a second axis; generating information derived from the data of the first output and the second output; and communicating the information to a remote computing device.

The method optionally further comprises the step of comparing the first output to a first threshold parameter and the second output to a second threshold parameter, and wherein the information is generated and communicated in response to determining that at least one threshold exceeded event is associated with the data from the first output and the data from the second output.

Preferably, the method further comprises the step of storing the information within a memory of a controller, and wherein the controller is configured to communicate the information to the remote computing device after receiving an instruction to do so. The information may be communicated wirelessly to the remote computing device. Alternatively, the information may be communicated via a removable physical memory.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

As used herein, the word "comprise" or variations such as "comprises" or "comprising" is used in an inclusive sense, i.e. to specify the presence of the stated features but not to preclude the presence or addition of further features in various embodiments of the invention.

As used herein, "flat ground" corresponds to a local area of underlying terrain which is at least substantially horizontal. A "slope" herein corresponds to a local area of underlying terrain which is not horizontal, for example, the side of a hill or mound.

Figure 1:
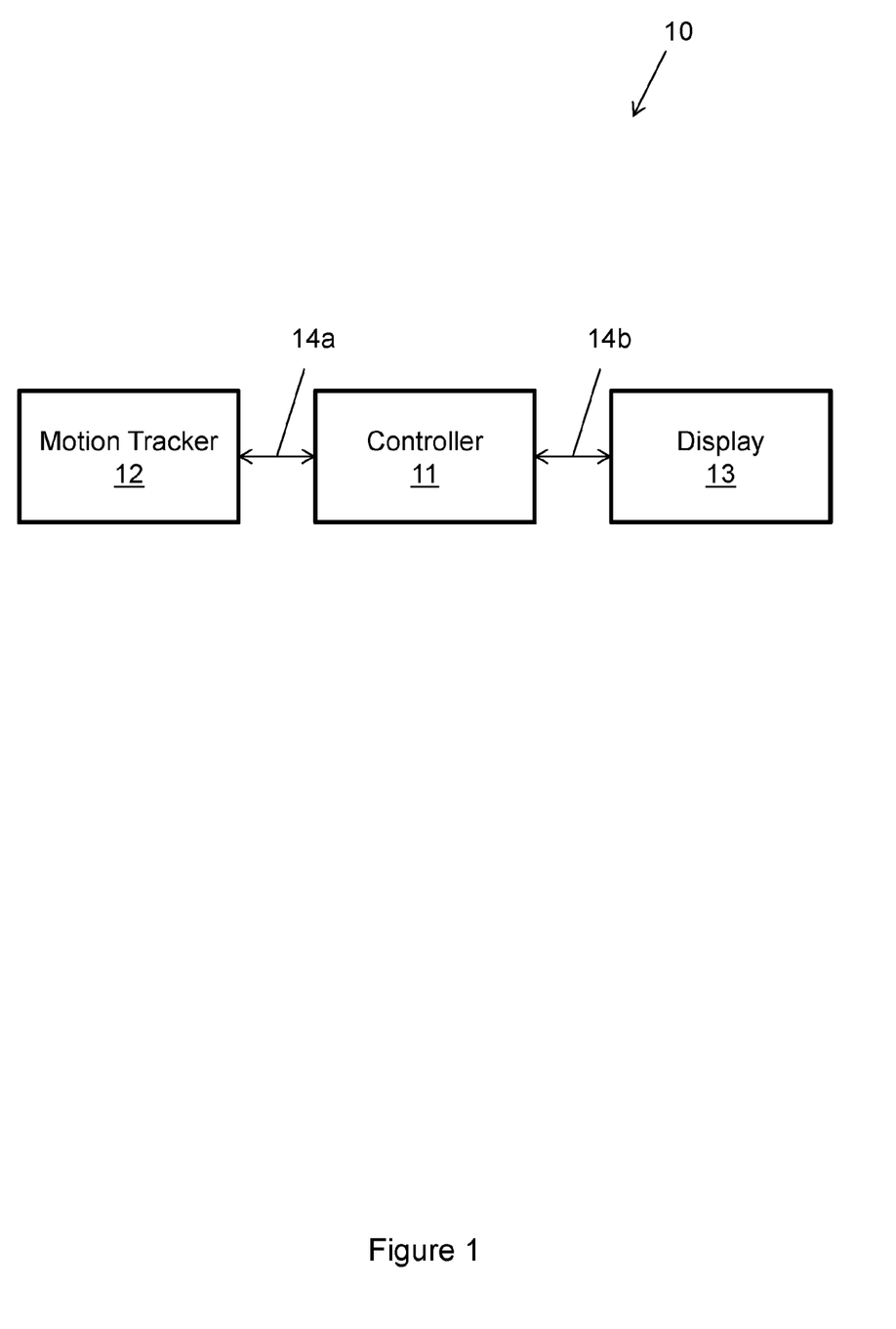
FIG. 1 shows a tilt-sensing apparatus.

A tilt-sensing apparatus 10 according to an embodiment is shown in FIG. 1. The tilt-sensing apparatus 10 comprises a controller 11 in communication with a motion tracker 12 and a display 13. Typically, a first connection 14a will be provided between the controller 11 and the motion tracker 12, and a second connection 14b will be provided between the controller 11 and the display 13. In the implementations described herein, both the first and second connections 14a, 14b are wired data connections. However, in alternative implementations, either or both of these wired data connections are replaced with wireless data connections. Suitable wired data connection protocols include: RS-232; RS-422; RS-485; USB; Ethernet; FireWire; Controller Area Network (CAN) bus; etc. Suitable wireless data connection protocols include: Wi-Fi; Bluetooth; Z-Wave; Zigbee; etc.

In the embodiment of FIG. 1, the controller 11 is located separately, and in a separate controller housing 24, to both the motion tracker 12 and the display 13. Typically, the motion tracker 12 comprises a motion tracker housing 32 and the display 13 comprises a display housing 42. In this configuration, the first connection 14a comprises a first data cable fixedly or removably connecting the controller 11 and the motion tracker 12 and a second data cable fixedly or removably connecting the controller 11 and the display 13. In alternative embodiment (not shown), the controller 11 is located within the same housing as one of the motion tracker 12 and the display 13. In a variation, the controller 11 is effectively located within one of, or spread between, the motion controller housing 32 and the display housing 42. This may be the case where, for example, some of the functionality described herein is implemented by features of the motion tracker 12 and the remainder of the functionality is implemented by features of the display 13.

Figure 2:
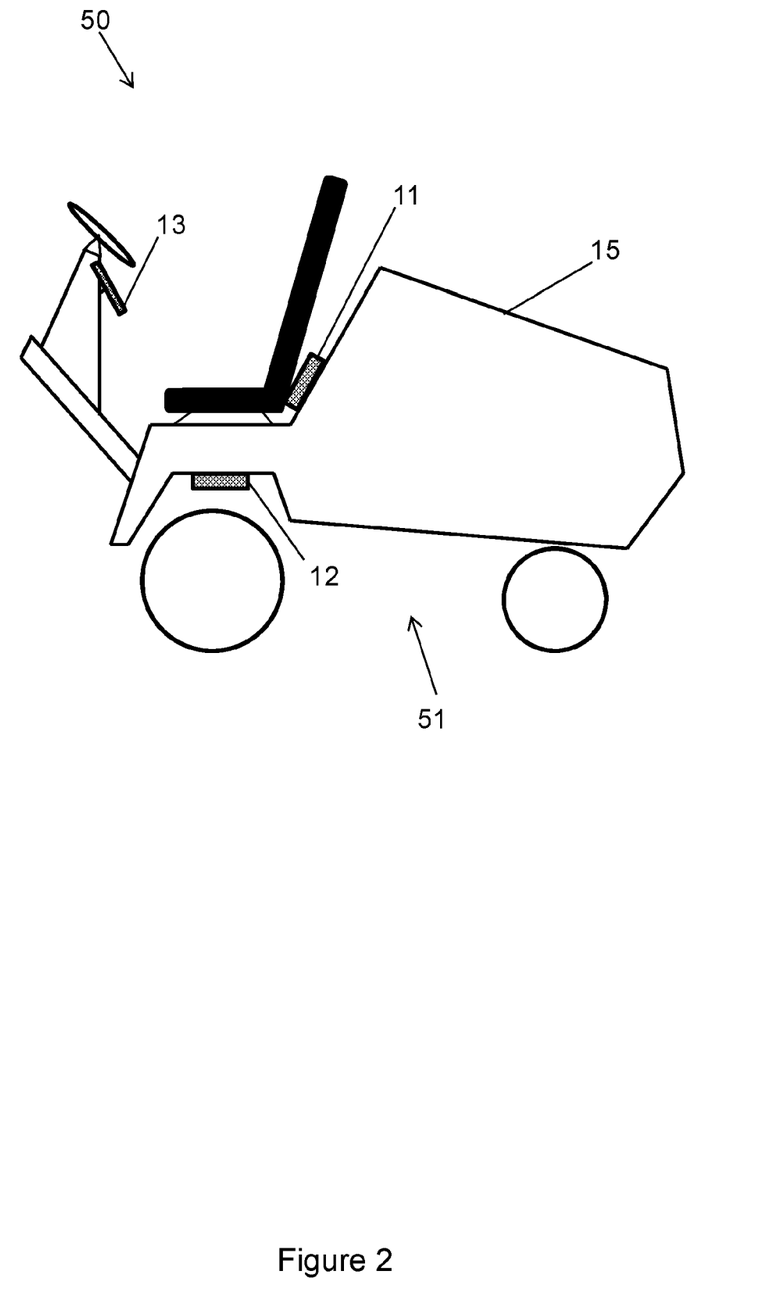
FIG. 2 shows a vehicle with the tilt-sensing apparatus installed.

Referring to FIG. 2, an example of the tilt-sensing apparatus 10 installed on a vehicle 15 is shown. The vehicle 15 comprises a driver's compartment 50 and a chassis 51. The vehicle 15 is shown in a simplified representation in order to appreciate the installation positions of the tilt-sensing apparatus 10, and is not intended to be limiting. The driver's compartment 50 is typically positioned away from the base of the chassis. The motion tracker 12 is positioned below the driver's compartment 50 on the chassis 51 such as to accurately measure the tilt angle of the vehicle 15. However, the display 13 is positioned in such a way as to be visible to a driver of the vehicle 15 (located in the driver's compartment). For example, the display 13 can be mounted to a dashboard of the vehicle 15.

The motion tracker 12 is usually positioned on a (at least substantially) fixed position on the chassis 51. That is, the motion tracker 12 is positioned on a point of the vehicle 15 that accurately (or at least sufficiently accurately) maintains a constant relative alignment with the underlying terrain. For example, the motion tracker 12 may be positioned in close proximity to the wheel base. The display 13 is positioned near or within the driver's compartment 50 in such a way as to be viewed as necessary by a user of the vehicle 15. The controller 11 can be located in any suitable location. In the figure, the controller 11 is located in a protected area (behind the seat) of the driver's compartment 50. However, as previously stated, the controller 11 can be housed within the display housing 42 or the motion tracker housing 32 (or, in fact, may correspond to features present in both housings 32, 42).

Figure 3:
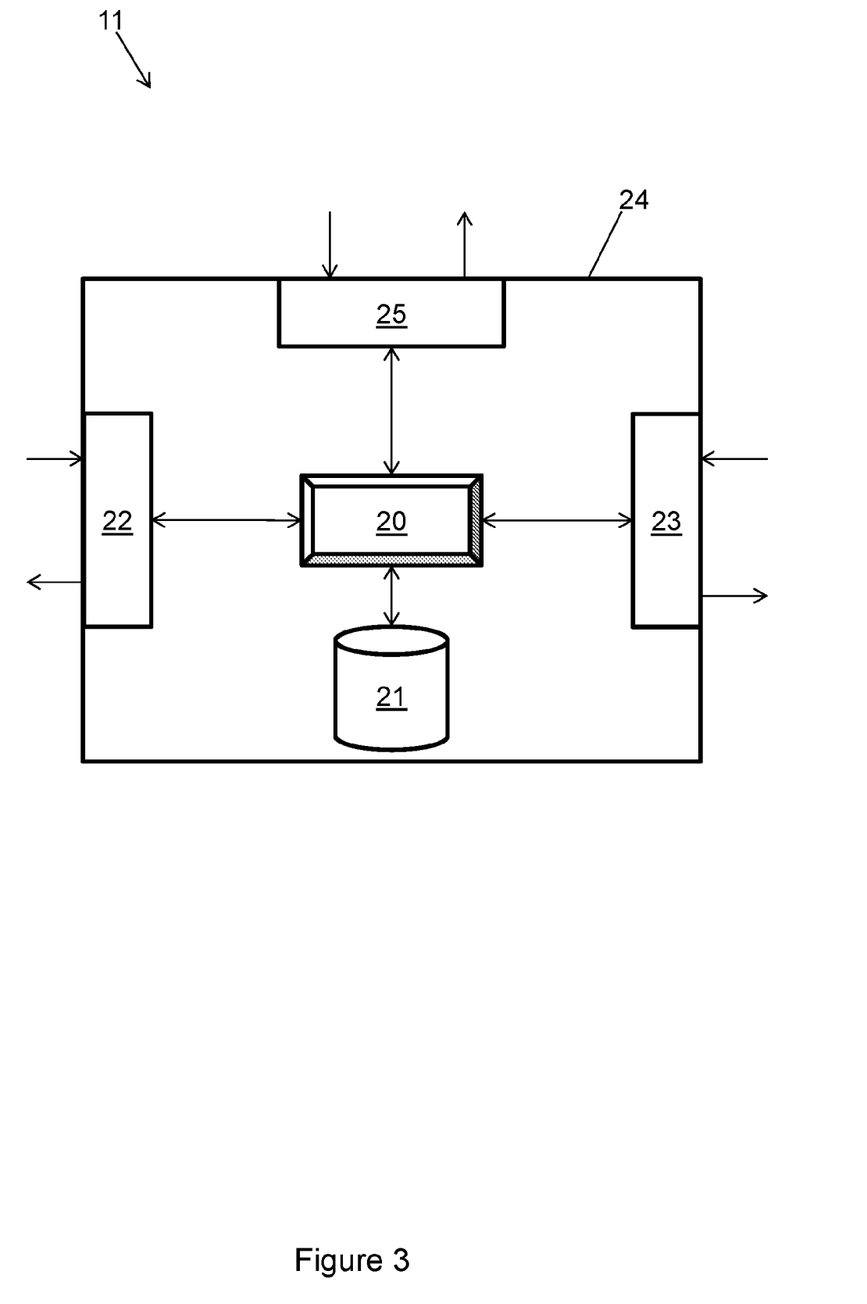
FIG. 3 shows a controller.

Referring to FIG. 3, the controller 11 comprises a processor 20 interfaced with a memory 21, a tracker communication interface 22, and display communication interface 23. These features are typically contained within the controller housing 24. The memory 21 is configured for storing program code for execution by the processor 20 and transient data generated during operation of the tilt-sensing apparatus 10. The memory 21 typically comprises a non-volatile component and a volatile component. The memory 21 is configured for storing one or parameters which influence operation of the control 11.

The processor 20 can comprise any hardware known in the art to be suitable for the computing operations (such as data processing) described herein. For example, the processor 20 can comprise: one or more single core central processing units; one or more multi-core central processing units; one or more microcontrollers; one or more programmable logic devices; or combinations thereof. The processor 20 can correspond to multiple processing units located within different housings 24, 32, and/or 42.

In the embodiment shown, the controller 11 further comprises an interface port 25. The interface port 25 is configured to allow instructions to be communicated from an external source to the processor 20. The external source can be a human operator, a computing system, or any other suitable source of instructions for the processor 20. The interface port 25 can also be configured to allow the processor 20 to communicate information to an external source. The interface port 25 is shown schematically, and an implementation may include several different physical and/or logical ports suitable for interfacing the processor 20 with one or more external sources. For example, the one or more parameters may be updateable by an action of the processor 20, and the processor 20 is instructed by the external source via the interface port 25 to update the one or more parameters. In another example, data stored within the memory 21 can be communicated to the external source.

In an alternative embodiment (not shown), the controller 11 is not configured to interface with an external source, for example, where the one or more parameters are "hard wired". This may be appropriate where the one or more parameters correspond to legal and/or industry standards and are not intended to be altered.

In an embodiment, the interface port 25 comprises a wireless communication module. The wireless communication module can comprise a small area wireless communication standard such as Bluetooth, Wi-Fi, ZigBee, Z-Wave, etc. The wireless communication module can also, or alternatively, comprise a wide-area wireless communication standard such as GPRS, LTE, etc.

The processor 20 is configured to receive data from, and optionally send data to, the motion tracker 12 via the tracker communication interface 22. Data received from the motion tracker 12 can be received in real-time or periodically. The processor 20 is also configured to send data to, and optionally receive data from, the display 13 via the display communication interface 23. Data sent to the display 13 can be sent in real-time or periodically. For ease of description, herein reference is made to the controller 11 undertaking computing operations, for example, data processing. It is to be understood that it is the processor 20 which performs said computing operations.

Figure 4:
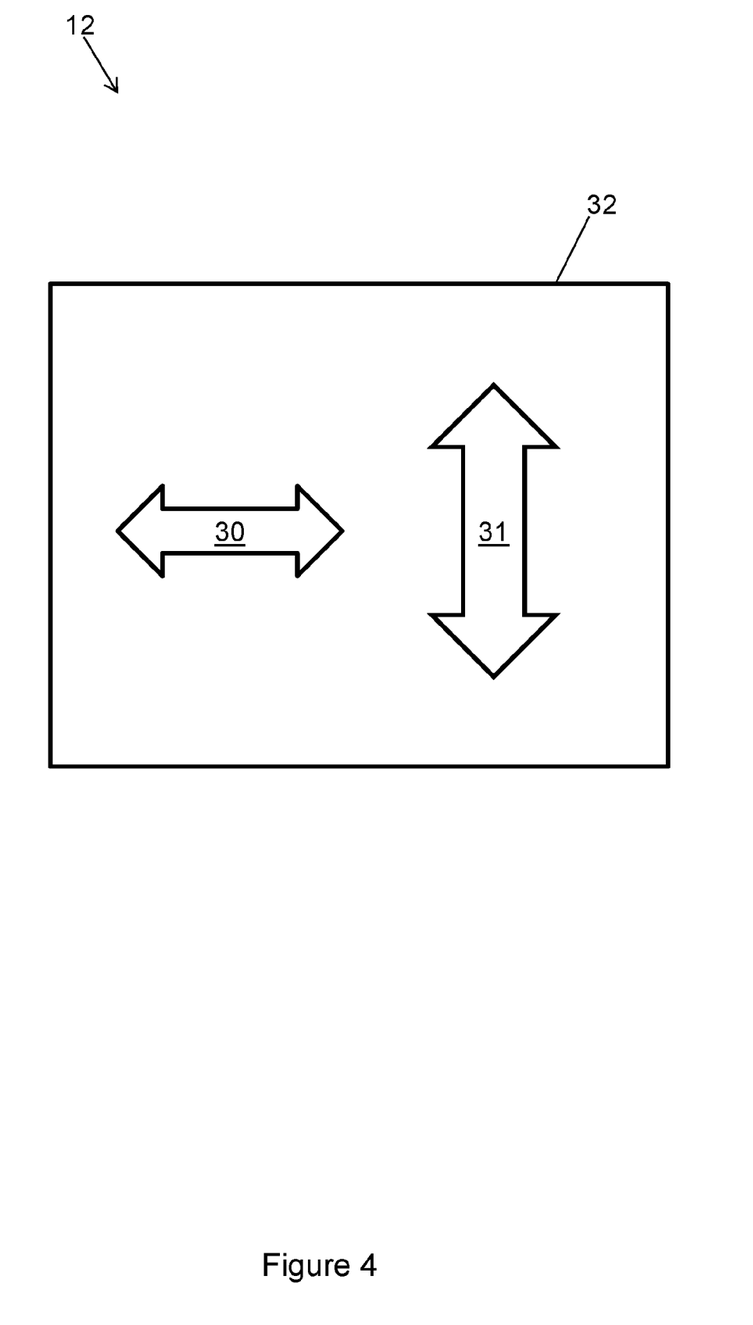
FIG. 4 shows a motion tracker.

The motion tracker 12 according to an embodiment is shown in FIG. 4. The motion tracker 12 comprises the motion tracker housing 32 comprising within a first tilt sensor 30 and typically a second tilt sensor 31. The tilt sensors 30, 31 can be individual components or integrated into a single package. The first tilt sensor 30 provides a first output comprising data corresponding to a measured first tilt angle with respect to a first axis and the second tilt sensor 31 provides a second output comprising data corresponding to a measured second tilt angle with respect to a second axis. Typically the second axis is orthogonal to the first axis. Also typically, the first axis corresponds (when the motion tracker 12 is affixed to a vehicle 15) to either the forward/backward direction of the vehicle 15 or the left/right direction of the vehicle 15, and the second axis corresponds to the other.

The motion tracker 12 can be configured for installation such that the first axis and second axis are each parallel (or substantially parallel) the underlying terrain. In an alternative, the motion tracker 12 utilises a three dimensional sensor that is configured to produce a calibrated output corresponding to the first and second tilt sensors 30, 31 based on installation of the motion tracker 12 in an arbitrary position.

The motion tracker 12 may comprise an accelerometer and gyroscope, for example, a 3-axis gyroscope and a 3-axis accelerometer. The accelerometer and gyroscope are typical configured using parameters that specify, for example, a range of accelerations or rate of rotations ("rotation") that may be measured. In an embodiment, the motion tracker 12 further comprises a limiter provided to reduce errors caused by large accelerations and/or rotations of the vehicle 15 (for example, due to changes in changes in speed and/or direction of the vehicle 15). The limiter is configured to determine that the vehicle 15 is undergoing a threshold acceleration and/or threshold rotation due to motion of the vehicle 15.

Upon determining that the threshold acceleration and/or threshold rotation is occurring, the limiter is configured to interact with the output of the accelerometer and/or gyroscope to reduce errors (and/or the accumulation of errors) resulting from the accelerometer and/or gyroscope operating outside of a configured range. In an implementation, the limiter adjusts the configuration of the accelerometer and/or gyroscope in order to extend the range of operation (such that the accelerometer and/or gyroscope are configured to operate over larger accelerations and rates of rotation). On determining that the vehicle 15 is no longer undergoing the threshold acceleration, the limiter returns the configuration of the accelerometer and/or gyroscope to their original configuration.

The limiter therefore enables the accelerometer and/or gyroscope to operate according to predetermined preferred parameters while reducing or avoiding errors due to the vehicle 15 experiencing excessive accelerations and/or rotations.

In an embodiment, the controller 11 is configured for recording operating data into its memory 21. The operating data can, for example, comprise the "raw data" of the tilt sensors 30, 31, that is, the measured first and second tilt angles. Alternatively, the operating data can comprise processed data derived from the tilt sensors 30, 31 and/or event specific data, for example, only data corresponding to a threshold exceeded event (described below). In another example, the operating data corresponds to a subset of the raw data of the tilt sensors 30, 31 such as time-averaged data.

The motion tracker 12 is configured to provide the outputs of the tilt sensors 30, 31 to the controller 11 via the first data connection 14a. The outputs are typically in the form of digital signals, however, in an embodiment the outputs are analogue signals. In this later case, the tracker communication interface 22 of the controller 11 is configured for converting, via an analogue-to-digital converter, the analogue signal into a digital representation (i.e. a digital signal).

In an embodiment, the motion tracker housing 32 comprises one or more attachment features to assist with attachment of the motion tracker 12 to the vehicle 15. For example, the one or more attachment features may be particularly selected to allow ease of attachment to the particular model of the vehicle 15 to which the motion tracker 12 is being attached.

In an embodiment, the motion tracker housing 32 comprises alignment means to assist in determining the correct relative alignment of the motion tracker 12 with respect to the vehicle 15 to ensure that the motion tracker 12 produces outputs corresponding to first and second axes being parallel (or substantially parallel) to the underlying terrain.

Typically, the motion tracker 12 outputs will be calibrated such that the "zero-points" of the outputs correspond to the vehicle 15 being positioned upon flat ground. In an embodiment, calibration is an automated process which occurs when the motion tracker 12 is first powered on (or otherwise put into an active mode). In an embodiment, calibration may require positioning the vehicle 15 on which the motion tracker 12 is affixed onto flat (or substantially flat) terrain, and then instructing the motion tracker 12 to calibrate its output such that the first tilt angle and second tilt angles are measured with respect to flat ground. It is understood that instead of the outputs of the motion tracker 12 being changed in order to achieve calibration, the controller 11 can be configured to interpret the outputs of the motion tracker 12 when the vehicle 15 is positioned on flat ground as corresponding to the calibrated position. In an embodiment, selectable calibration is provided as a procedure selectable by an operator, for example, by an operator using an input means such as a button. Selectable calibration may be performed once (for example, a "factory calibration") or on occasion at the election of an operator. Typically, the motion tracker 12 is affixed onto the vehicle 15, and the vehicle 15 is positioned on a flat surface before initiation of the selectable calibration. Selectable calibration results in the motion tracker 12 indicating a flat surface when the vehicle 15 is positioned on a flat surface in the future; therefore, the results of the selectable calibration are typically stored, for example, in a memory of the controller 11 or the motion tracker 12.

The motion tracker 12 may be configured for installation at a particular orientation, which is typically indicated on the motion tracker housing 32. For example, with "left" and "right" indicated. Optionally, the output of the motion tracker 12 can be adjusted (or, the interpretation by the controller 11 of the motion tracker 12 output) such that a correction can be made for incorrect installation. For example, if the motion tracker housing 32 is installed on the vehicle with "left" in fact facing right (and vice versa), then the motion tracker 12 (or controller 11) is adjusted such that the controller 11 interprets the directions correctly.

Figure 5:
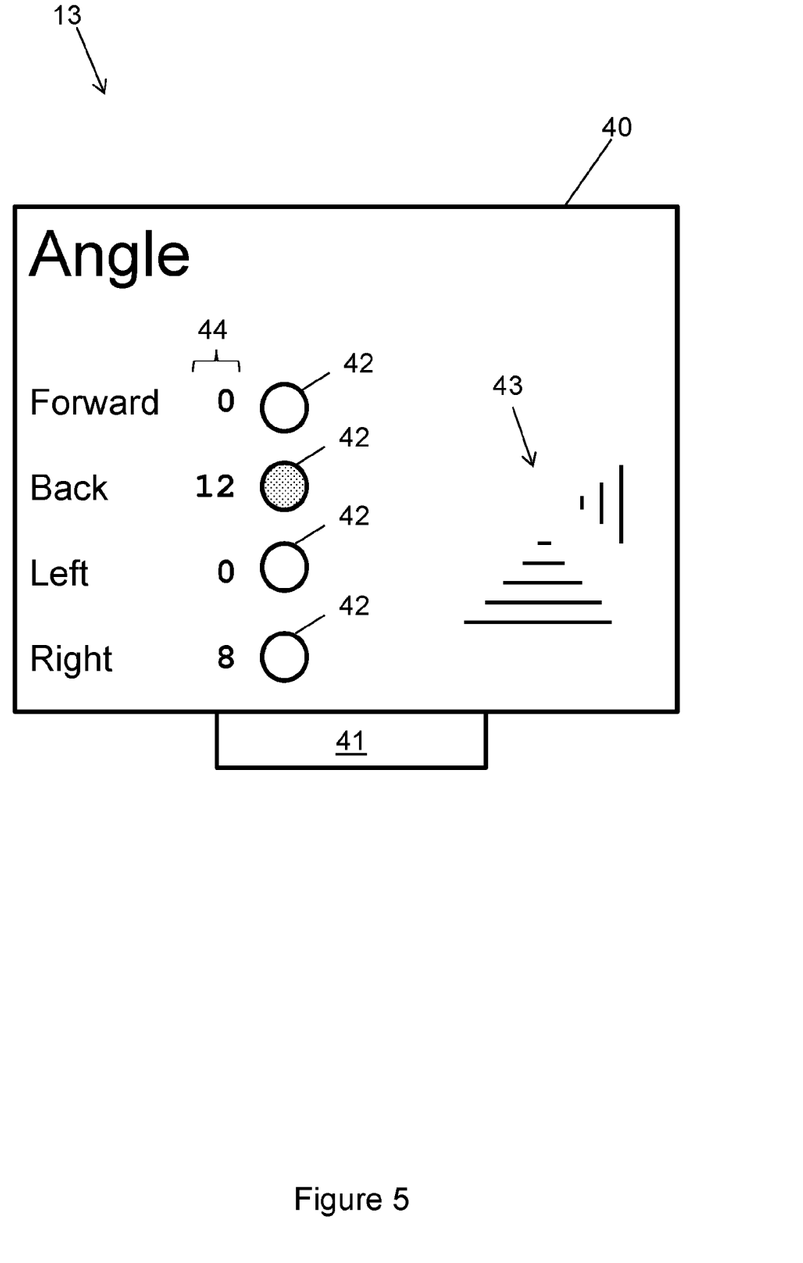
FIG. 5 shows a display.

Referring to FIG. 5, the display 13 comprises a visual display module 40. Example visual display modules 40 include Liquid Crystal Displays (LCDs), Organic Light Emitting Diode screens (OLED screens), etc. Optionally, the display 13 further comprises an audio module 41. The display 13 is configured display a graphical representation viewable by a user of the vehicle 15 via the visual display module 40 derived from the data received from the output of the first and second tilt sensors 30, 31. In effect, the display 13 is configured to show to the user an indication of the tilt being experienced by the vehicle 15 to which the motion tracker 12 is affixed. The display 13 receives data comprising an instruction, typically carried by a digital signal, from the controller 11 (via its display communication interface 23). The instruction determines the graphical representation that is to be displayed on the display module 40. Where applicable, the display signal further comprises data corresponding to an instruction to cause the audio module 41 to produce an audible warning.

In an embodiment, the controller 11 is interfaced with an auxiliary speaker, which is located separately to the display 13. The controller 11 can be interfaced directly with the speaker, for example via a wired or wireless connection between the speaker and the controller 11. Alternatively, the controller 11 can be interfaced indirectly with the speaker, for example, the speaker may be connected via a wired connection to the display 13, the motion tracker 12, or alternatively the speaker can be provided with the vehicle 15.

In the figure, there are shown circular non-numerical graphical indicators 42, line-based non-numerical graphical indicators 43, and numerical indicators 44. In this example, the circular non-numerical graphical indicators 42 change appearance (e.g. colour) when a tilt angle exceeds an associated threshold parameter. The line-based non-numerical graphical indicators 42 provide an indication on the value of an associated tilt angle as well as optionally changing colour to indicate a threshold parameter has been exceeded. The numerical indicators 44 change to indicate the value of a tilt angle, for example, as expressed in degrees.

In an embodiment, the display 13 corresponds to a display of the vehicle 15 to which the motion tracker 12 and controller 11 are affixed. In this case, the controller 11 is configured to provide suitable instructions and data to the display 13 of the vehicle 15 to enable presentation to the user of tilt being experienced by the vehicle 15. For the purpose, the controller 11 can comprise a suitable interface, such as a CAN bus, configured for interfacing (typically via a wired connection) with the display 13 of the vehicle 15. The audio module 41 can be configured to produce a warning sound, a repeating warning sound, etc. Alternatively, or in addition, the audio module 41 can be configured to provide a voice warning, such as a recognisable statement that a threshold parameter has been exceeded. The voice warning can also provide suggestions or instructions to the driver of the vehicle 15 as to how to remedy the situation causing the threshold parameter to be exceeded.

Figure 6:
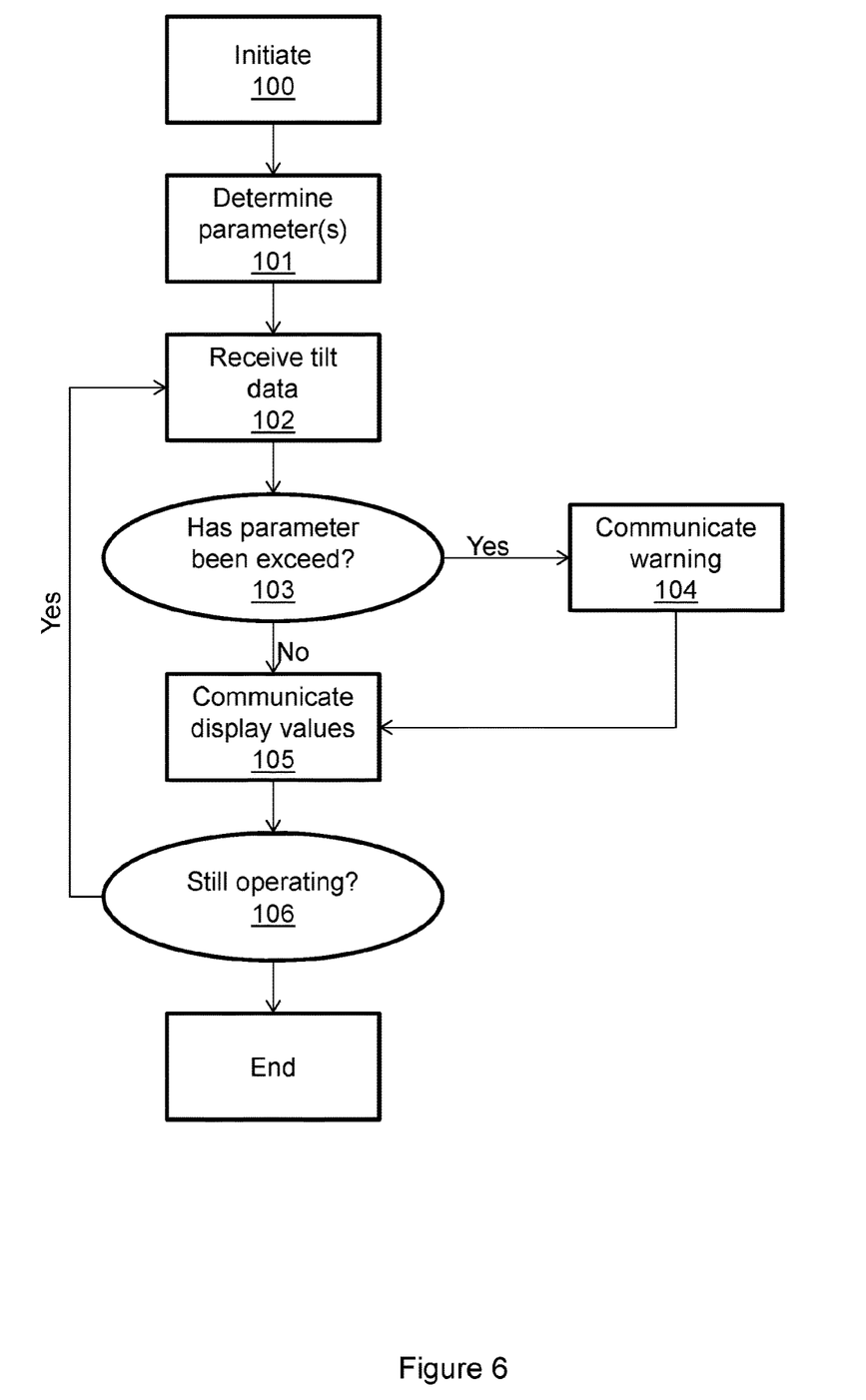
FIG. 6 shows method of operating the tilt-sensing apparatus.

FIG. 6 shows a method of operating the tilt-sensing apparatus 10. First, the tilt-sensing apparatus 10 is initialised at initiation step 100. Initiation step 100 can correspond to simply providing electrical power to the tilt-sensing apparatus 10 and/or may require an action of a user. The initiation step 100 may also require calibration of the motion tracker 12.

The controller 11 then determines a first threshold parameter associated with the first axis and typically a second threshold parameter associated with the second axis, at parameter determination step 101. Typically, the threshold parameters are stored within the memory 21 (e.g. a non-volatile memory) of the controller 11.

In an embodiment, the first threshold parameter specifies a threshold tilt angle in either direction along the first axis. Similarly, the second threshold parameter specifies a threshold tilt angle in either direction along the second axis.

In another embodiment, the first threshold parameter comprises two threshold tilt angles, the first of which corresponds to a tilt angle with respect to a first direction of the first axis and the second of which corresponds to tilt angle with respect to a second direction (opposite the first) of the first axis. Similarly, the second threshold parameter comprises two threshold tilt angles, the first of which corresponds to tilt angle with respect to a first direction of the second axis and the second of which corresponds to tilt angle with respect to a second direction (opposite the first) of the second axis.

Next, the controller 11 receives data from the first output and typically the second output of the motion tracker 12. The data comprises the measured first tilt angle and the measured second tilt angle, at data reception step 102. Typically, the data is received periodically (for example, every 0.5 seconds), however, other rates including effectively continuous reception of data are envisaged. The controller 11 then undertakes any necessary processing of the received data in order to compare it to the threshold parameters.

The first tilt angle is compared to the first threshold tilt angle and the second tilt angle is compared to the second threshold tilt angle, at comparison step 103. In particular, the controller 11 is configured to identify if either or both of the first and second tilt angles exceed the corresponding threshold parameter (herein referred to as "threshold exceeded event(s)"). In the embodiment having two threshold tilt angles, one for each direction along an axis, the controller 11 is configured to identify if either of these threshold tilt angles are exceeded.

If a threshold exceeded event (or events) is identified, then the controller 11 generates an instruction for the display 13 to display a graphical warning indicating that the first and/or second threshold parameters has been exceeded, at warning generation step 104. Where an audio module 41 is present, the controller 11 also generates an instruction for the display 13 to cause an audible warning.

At communicate display values step 105, the controller 11 then communicates an instruction to the display 13 to display a graphical representation of the first tilt angle and a graphical representation of the second tilt angle according to the data received at step 102, and if generated, the instruction to display the graphical warning (and, where applicable, to cause the audible warning). In the example of FIG. 4, the graphical representation of the first tilt angle comprises a numerical representation indicating the tilt angle (optionally, a numerical value of the tilt angle with respect to the first direction and a separate numerical representation of the tilt angle with respect to the second direction) and the graphical representation of the second tilt angle comprises a numerical representation indicating the tilt angle (optionally, a numerical value of the tilt angle with respect to the first direction and a separate numerical representation of the tilt angle with respect to the second direction). Alternatively, or in addition, the graphical representation of the first tilt angle comprises a non-numerical representation indicating the tilt angle (optionally, a non-numerical value of the tilt angle with respect to the first direction and a separate non-numerical representation of the tilt angle with respect to the second direction) and the graphical representation of the second tilt angle comprises a non-numerical representation indicating the tilt angle (optionally, a non-numerical value of the tilt angle with respect to the first direction and a separate non-numerical representation of the tilt angle with respect to the second direction).

The method then repeats steps 102-105 until an instruction is received to cease operation (see step 106). In practice, this instruction may simply be powering off of the tilt-sensing apparatus 10, or may result from, for example, a specific user action.

In an embodiment, at least one threshold tilt angle is associated with two or more threshold levels. The threshold levels are hierarchical, such that, for example, there is a lowest threshold level, a highest threshold level, and where applicable, intervening threshold levels. Each threshold level specifies, in effect, a unique threshold tilt angle and the threshold levels are arranged such that the lowest threshold level specifies a threshold tilt angle smaller than the highest threshold levels (and any intervening threshold levels). Similarly, the highest threshold level specifies a threshold tilt angle larger than the lowest threshold level (and any intervening threshold levels).

The generated instruction at step 104 is generated in dependence on which threshold level is exceeded (i.e. the highest threshold level which is exceeded). It may be that, for example, an audible warning is produced when the highest threshold level is exceeded. In another example, the display 13 is configured to colour code the graphical representation in dependence on which threshold level is exceeded.

In another example, at least two threshold levels are associated with an audible warning, wherein the audible warning is different for each threshold level. In this example, the display 13 can be configured to produce a crescendo audible output; that is, the audible output increases in intensity, repeat frequency, and/or some other property, as the associated tilt angle becomes larger.

Figure 7:
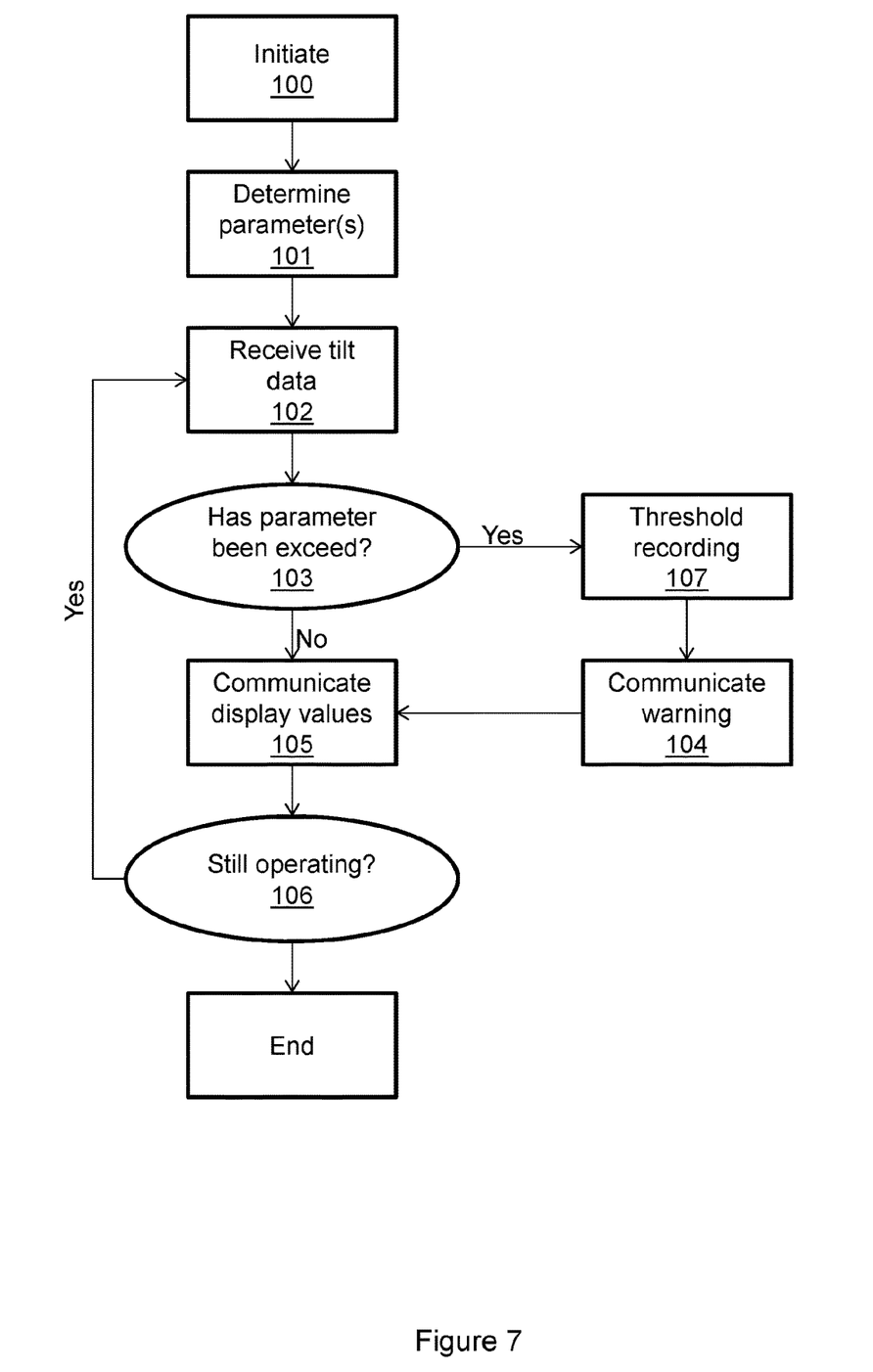
FIG. 7 shows a modification to the method of FIG. 6.

Referring to FIG. 7, a modification to the method of FIG. 6 according to an embodiment is shown. The method of FIG. 7 includes the additional step of recording, within the memory 21 of the controller 11 (typically, its non-volatile memory), instances where one or more threshold tilt angles have been exceeded (see threshold recording step 107). The controller 11 can be configured to make a record corresponding to each received data comprising tilt angles in which it is determined that a threshold exceeded event has occurred.

Figure 8:
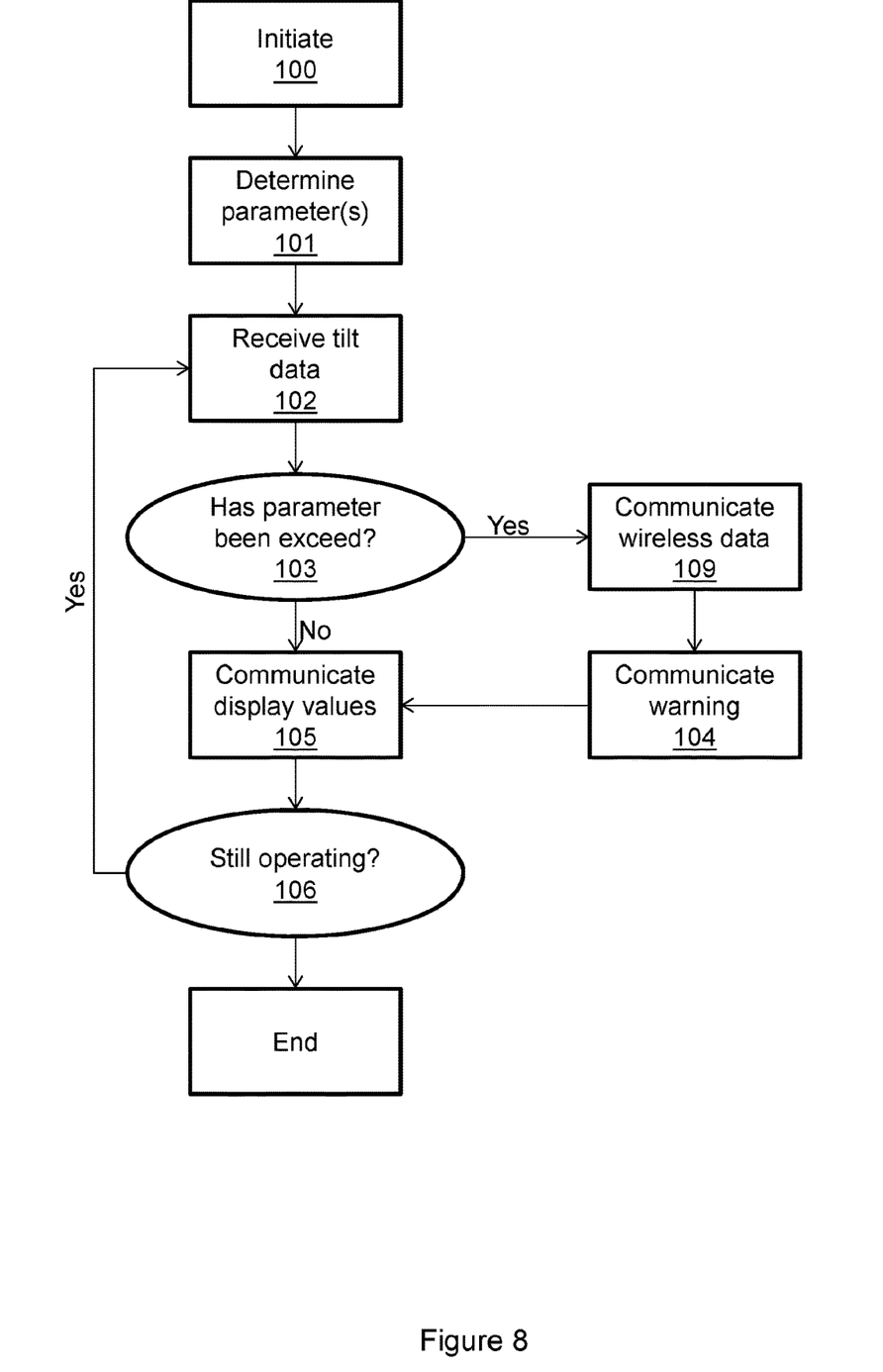
FIG. 8 shows a modification to the method of FIG. 6.

Referring to FIG. 8, another modification to the method of FIG. 6 according to an embodiment is shown. The method of FIG. 8 includes an additional step of communicating, via an optional wireless communication module of the interface port 25, information derived from the received data, such as the first and second tilt angles, at communicate wireless data step 109. Optionally, as shown, the communication is only undertaken in instances where one or more threshold tilt parameters have been exceeded (see threshold communication step 108). The controller 11 can be configured to make a communication for each received periodic data associated with a threshold exceeded event. In an implementation, only one communication is made for a continuous series of threshold exceeded events. Typically, the communication is directed towards a predetermined remote computing device, such as a server or personal computing device operated by an entity associated with the vehicle 15. The communication typically comprises, when applicable, data comprising an indication that the threshold parameter(s) has been exceeded, and typically the measured tilt angle(s) that exceed the threshold parameter(s).

The data is stored within a memory of the remote computing device and/or an alert is generated that may inform a user of the remote computing device that a threshold exceeded event has occurred.

Figure 9:
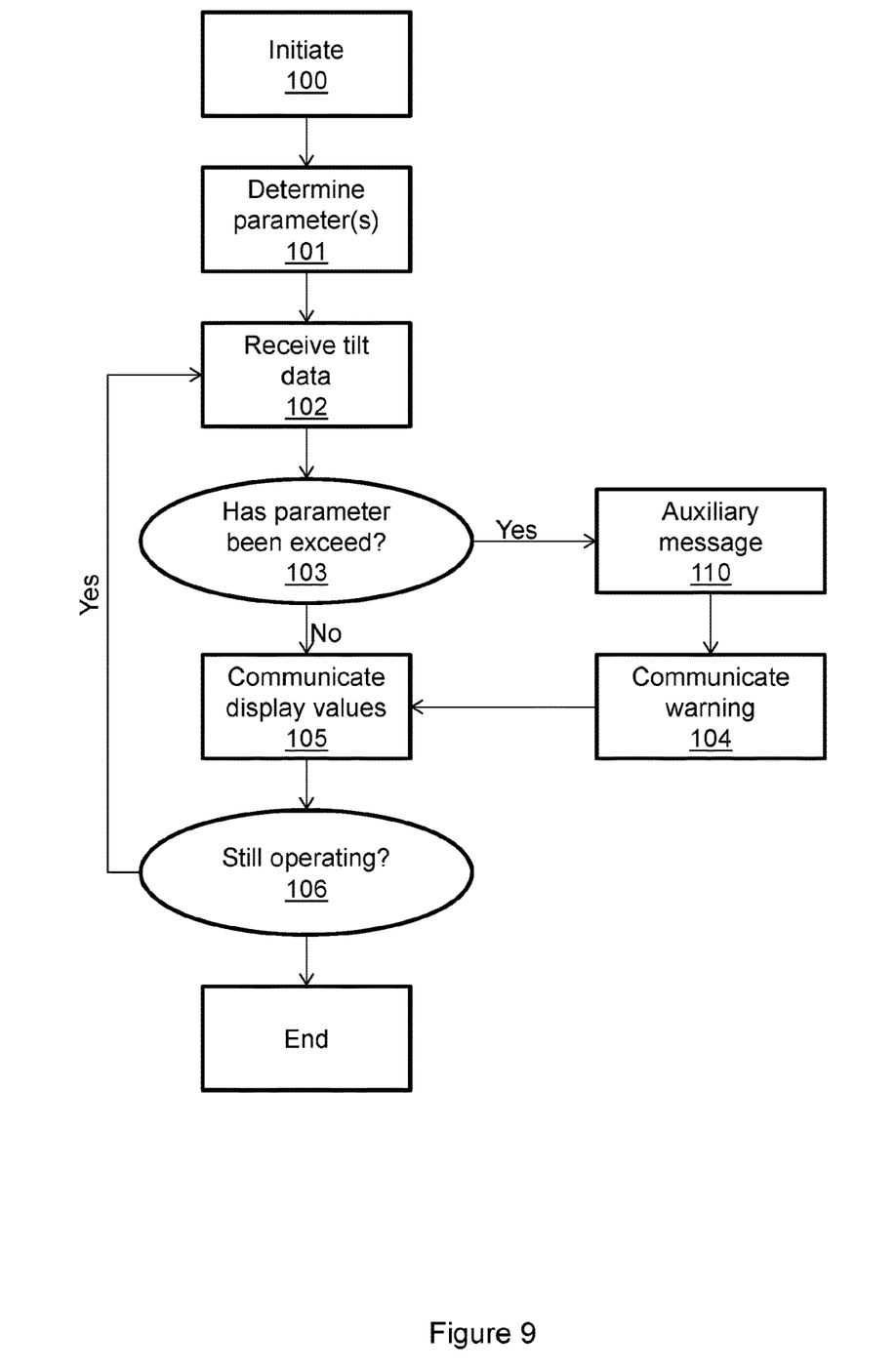
FIG. 9 shows a modification to the method of FIG. 6.

Considering the methods of FIGS. 8 and 9, it is anticipated that when these methods are utilised with embodiments having threshold levels as per FIG. 7, then the recording and/or communication associated with threshold exceeding events can be configured to occur only when certain threshold levels, such as a highest threshold level, are exceeded.

In an embodiment, as shown in FIG. 9, the comparison step 103 results in the determination of a threshold exceeding event, the controller 11 communicates an auxiliary message to a vehicle controller of the vehicle 15 via its auxiliary output 27, at auxiliary message step 110. In an example, the vehicle controller of the vehicle 15 is configured to undertake a safety action on receipt of the auxiliary message. In embodiments comprising two or more threshold levels, it is envisaged the preferentially an auxiliary message is communicated once a particular (for example, the highest) threshold level is reached.

In an embodiment, the controller 11 can be temporarily disabled, for example, through an action of a user (e.g. by pressing a button provided for the purpose). The controller 11 can also be enabled in a similar manner (when enabled, the controller 11 operates as described herein). When disabled, the controller 11 does not provide one or more of the visual warning(s) and audible warning(s). In relevant embodiments, additionally, or in the alternative, when disabled, the controller 11 does not communicate data wirelessly. Optionally, the controller 11 is configured to become enabled due to a predefined trigger event (that is, not in response to a user interaction). For example, if a threshold tilt angle or a threshold condition is met, then the controller 11 is enabled. In one example, this allows a user to disable warning(s) except when a critical tilt angle is met so that a warning will be issued even if the user has attempted to switch off warnings.

The apparatus 10 advantageously enables a driver of the vehicle 15 to receive up to date feedback of the orientation of the vehicle 15, via the display 13. A further advantage is that the motion tracker 12 can be positioned at a location on the vehicle 15 that accurately (or at least with sufficient accuracy) represents the contours of the underlying terrain—typically, this location will not be visible (or easily visible) by a driver of the vehicle 15. Typically, the motion tracker 12 will be located near the base of the vehicle 15, as this provides an accurate measurement of the tilt of the vehicle 15. Despite the motion tracker 12 being, typically, located on the vehicle 15 out of view of the driver, the remote location of the motion tracker 12 to the display 13 means than the display can be positioned within view of the driver, thereby enabling the driver to accurately determine the orientation of the vehicle 15. The apparatus 10 advantageously therefore provides information to the driver of the vehicle 15 angle in four directions (e.g. forwards, backwards, left, and right), and thus corresponds to an Electronic Quad Axis Stability Sensor (EQASS).

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims. For example, the controller 11 may be implemented as functionality of a vehicle computing unit; that is, a computer provided as a feature of the vehicle 15.

The invention claimed is:

1. A tilt-sensing apparatus for a vehicle, comprising:
a controller; and
a motion tracker,
wherein the controller is configured for communication with the motion tracker and a display, wherein the motion tracker is configured for attachment to the vehicle at a position remote to the display and comprises a first tilt sensor configured to measure a first tilt angle with respect to a first axis and a second tilt sensor configured to measure a second tilt angle with respect to a second axis, wherein the controller is configured to receive data via an output of the motion tracker, said data comprising the first tilt angle and the second tilt angle, and communicate an instruction to the display to display a graphical representation indicative of the first tilt angle and the second tilt angle;
wherein the controller is further configured to determine that the first tilt angle has exceeded a preconfigured first threshold parameter and/or the second tilt angle has exceeded a preconfigured second threshold parameter and, in response, to communicate an instruction to the display to present a graphical warning and, wherein, in response, the display is configured to present the graphical warning;
wherein the controller is selectively disabled and enabled, and further wherein the controller is configured to change from disabled to enabled in response to one or both of the first tilt angle and second tilt angle meeting a predefined trigger event.

2. The tilt-sensing apparatus as claimed in claim 1, wherein the controller is locatable separately within the vehicle to the motion tracker, and further comprising a wired data connection between the controller and the motion tracker.

3. The tilt-sensing apparatus as claimed in claim 1, wherein the controller is locatable separately within the vehicle to the display, and further comprising a wired data connection between the controller and the display.

4. The tilt-sensing apparatus as claimed in claim 1, wherein the graphical representation of the first tilt angle comprises a numerical representation of the first tilt angle and wherein the graphical representation of the second tilt angle comprises a numerical representation of the second tilt angle.

5. The tilt-sensing apparatus as claimed in claim 1, wherein the graphical representation of the first tilt angle comprises a non-numerical representation of the first tilt angle and wherein the graphical representation of the second tilt angle comprises a non-numerical representation of the second tilt angle.

6. The tilt-sensing apparatus as claimed in claim 1, wherein the first threshold parameter comprises two or more threshold tilt angles, each associated with a direction of the first axis, and/or the second threshold parameter comprises two or more threshold tilt angles, each associated with a direction of the second axis.

7. The tilt-sensing apparatus as claimed in claim 1, the controller further comprises an auxiliary output configured for interfacing with the vehicle.

8. The tilt-sensing apparatus as claimed in claim 1, further comprising a limiter for reducing errors in measurement of acceleration and/or rate of rotation.

9. A method of providing feedback of the orientation of a vehicle, the method comprising the steps of:
receiving a first output from a first tilt sensor comprising data corresponding to a measured first tilt angle in respect of a first axis;
receiving a second output from a second tilt sensor comprising data corresponding to a measured second tilt angle along a second axis;
comparing the first output to a first threshold parameter and the second output to a second threshold parameter;

in response, generating a display instruction; and
communicating the display instruction to a display,
wherein the first tilt sensor and second tilt sensor are located within a motion tracker, and wherein the display is located remotely to the motion tracker,
wherein the first output and the second output are each received at a controller, and wherein the controller generates and communicates the display instruction;
wherein the controller is selectively enabled and disabled, and further comprising the step of the controller changing from disabled to enabled in response to one or both of the first tilt angle and second tilt angle meeting a predefined trigger event.

10. The method as claimed in claim 9, wherein the controller is located separately to the motion tracker and the first output and second output are received via a wired data connection between the controller and the motion tracker.

11. The method as claimed in claim 9, wherein the first output is compared to a first threshold tilt angle in a first direction along the first axis and a second threshold tilt angle in a second direction along the first axis and wherein the second output is compared to a threshold tilt angle in a first direction along the second axis and a threshold tilt angle in a second direction along the second axis.

12. The method as claimed in claim 9, further comprising the step of identifying that the first output exceeds the first threshold parameter and/or the second output exceeds the second threshold parameter, wherein the display instruction comprises an instruction to display a warning indicating the said first and/or second threshold parameters has been exceeded.

13. The method as claimed in claim 9, and further comprising the step of: Sep. 4, 2018 displaying, on the display: a first numerical indication of the first tilt angle comprising a first numeral value indicating the tilt angle in a first direction of the first tilt angle and a second numeral value indicating the tilt angle in a second direction of the first tilt angle, and a second numerical indication of the second tilt angle comprises a third numeral value indicating the tilt angle in a first direction of the second tilt angle and a forth numeral value indicating the tilt angle in a second direction of the second tilt angle.

14. The method as claimed in claim 9, further comprising the step of adjusting a parameter of an accelerometer and/or a gyroscope provided for determining the first output and second output in response to a limiter determining that a threshold acceleration and/or threshold rate of rotation is exceeded.

15. A vehicle comprising a tilt-sensing apparatus, comprising:
a controller; and
a motion tracker,
wherein the controller is configured for communication with the motion tracker and a display, wherein the motion tracker is configured for attachment to the vehicle at a position remote to the display and comprises a first tilt sensor configured to measure a first tilt angle with respect to a first axis and a second tilt sensor configured to measure a second tilt angle with respect to a second axis, wherein the controller is configured to receive data via an output of the motion tracker, said data comprising the first tilt angle and the second tilt angle, and communicate an instruction to the display to display a graphical representation indicative of the first tilt angle and the second tilt angle,
wherein the controller is further configured to determine that the first tilt angle has exceeded a preconfigured first threshold parameter and/or the second tilt angle has exceeded a preconfigured second threshold parameter and, in response, to communicate an instruction to the display to present a graphical warning and, wherein, in response, the display is configured to present the graphical warning;
wherein the controller is selectively disabled and enabled, and further wherein the controller is configured to change from disabled to enabled in response to one or both of the first tilt angle and second tilt angle meeting a predefined trigger event and
wherein the display is located such as to be visible to a driver of the vehicle and wherein the motion tracker is securely affixed to the vehicle in a location on a fixed chassis portion of the vehicle.

16. The method as claimed in claim 9, further comprising displaying, on the display:
a first non-numerical graphical representation of the first tilt angle and a second non-numerical graphical representation of the second tilt angle.

* * * * *